(12) United States Patent
Wildman et al.

(10) Patent No.: US 9,569,561 B2
(45) Date of Patent: Feb. 14, 2017

(54) LABEL MASKED ADDRESSABLE MEMORY

(71) Applicant: Cisco Technology, Inc., San Jose, CA (US)

(72) Inventors: Christopher A. Wildman, Alamo, CA (US); Laura Sharpless, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 672 days.

(21) Appl. No.: 13/937,390

(22) Filed: Jul. 9, 2013

(65) Prior Publication Data

US 2015/0019563 A1  Jan. 15, 2015

(51) Int. Cl.
*G06F 17/30* (2006.01)
*G11C 15/00* (2006.01)
*H04L 9/12* (2006.01)
*H04L 29/06* (2006.01)

(52) U.S. Cl.
CPC ......... *G06F 17/30982* (2013.01); *G11C 15/00* (2013.01); *H04L 9/12* (2013.01); *H04L 63/0435* (2013.01)

(58) Field of Classification Search
CPC ........... G06F 17/3033; G06F 17/30982; G11C 15/00; H04L 63/0435; H04L 9/12
See application file for complete search history.

(56) References Cited

U.S. PATENT DOCUMENTS

| | | | |
|---|---|---|---|
| 6,516,383 B1 | 2/2003 | Patra et al. | |
| 6,862,281 B1 | 3/2005 | Chandrasekaran | |
| 6,934,796 B1* | 8/2005 | Pereira | G11C 15/00 365/49.17 |
| 7,349,230 B2 | 3/2008 | Parthasarathy et al. | |
| 7,350,020 B2 | 3/2008 | Kanekar et al. | |
| 7,382,637 B1* | 6/2008 | Rathnavelu | G11C 15/00 365/189.05 |
| 7,602,787 B2 | 10/2009 | Cheriton | |
| 7,680,806 B2 | 3/2010 | Qian | |
| 7,827,402 B2 | 11/2010 | Smith | |
| 2006/0277178 A1* | 12/2006 | Wang | G06F 17/30306 |
| 2008/0267188 A1* | 10/2008 | Furber | H04L 12/18 370/392 |
| 2011/0292939 A1* | 12/2011 | Subramaian | H04L 45/54 370/392 |

(Continued)

*Primary Examiner* — Marsha D Banks Harold
*Assistant Examiner* — Anthony Luo
(74) *Attorney, Agent, or Firm* — Edell, Shapiro & Finnan, LLC (57) ABSTRACT

A network device receives data packets and derives a key from headers in the packets. A search engine in the device searches, or performs a table lookup, for information based on the key and multiple programmable masks. The search engine includes a hash based search engine that comprises multiple mask modules each to mask an input key with a respective programmable mask, to produce multiple masked keys. The search engine also includes an array of hash modules each corresponding to a respective one of the masked keys and including a hash table. Each of the hash modules searches its hash table for a data value based on a hash of the corresponding masked key, and outputs a found data value, if any, resulting from the search. A selector selects among the found data values and output the selected data value.

17 Claims, 6 Drawing Sheets

(56) References Cited

U.S. PATENT DOCUMENTS

2012/0143877 A1* 6/2012 Kumar ................ H04L 45/745
    707/747
2012/0254193 A1* 10/2012 Chattopadhyay . G06F 17/30979
    707/747

* cited by examiner

LABEL MASKED ADDRESSABLE MEMORY

TECHNICAL FIELD

The present disclosure relates generally to efficient hash based searches.

BACKGROUND

High-performance computing (HPC) uses supercomputers and/or computer clusters to solve complex science, engineering and business projects using applications that require high bandwidth, low latency networking, and very high compute capabilities for packet transfer within a network. Open Systems Interconnection (OSI) model layers are typically utilized for processing packets within a network, such as for determining a route for packets to travel within the network from a source node to a destination node. Those model layers include OSI Layer 2 (Data Link), Layer 3 (Network) and Layer 4 (Transport).

A conventional networking device, such as a packet switch, includes L2 and L3 interface derivation logic to derive information from packet headers and use that information to perform memory search/data look-up operations in support of switch operations. Conventional derivation logic may use Ternary Content Addressable Memory (TCAM) to perform match-based memory searches. A TCAM tends to increase decision latency, may be difficult to scale up and down as necessary, and uses a relatively large circuit area.

DESCRIPTION OF EXAMPLE EMBODIMENTS

Overview

A Label Masked Addressable Memory (LMAM) is provided that is used as a hash based search engine in a network device to perform searches. The LMAM includes multiple mask modules which mask an input key with a respective programmable key mask, to produce multiple masked keys. The LMAM also includes multiple hash modules each corresponding to a respective one of the masked keys and including a hash table. Each of the hash modules searches its hash table for a data value based on a hash of the corresponding masked key, and outputs a found data value, if any, resulting from the search. A selector selects among the found data values and outputs the selected data value.

Example Embodiments

A network device, such as switch, may include L2 and L3 interface derivation logic. The L2 and L3 interface derivation logic derives information, such as a key, from packet headers, and then uses that information to perform table lookup operations in support of L2 and L3 switch protocols implemented in the network device. The interface derivation logic includes an LMAM as described in examples herein, which serves as a flexible hash-based search engine to perform the required table lookup operations. The LMAM advantageously exhibits low latency for searches, is scalable, supports virtualization and multi-tenancy, and reduces integrated circuit area requirements.

Figure 1:
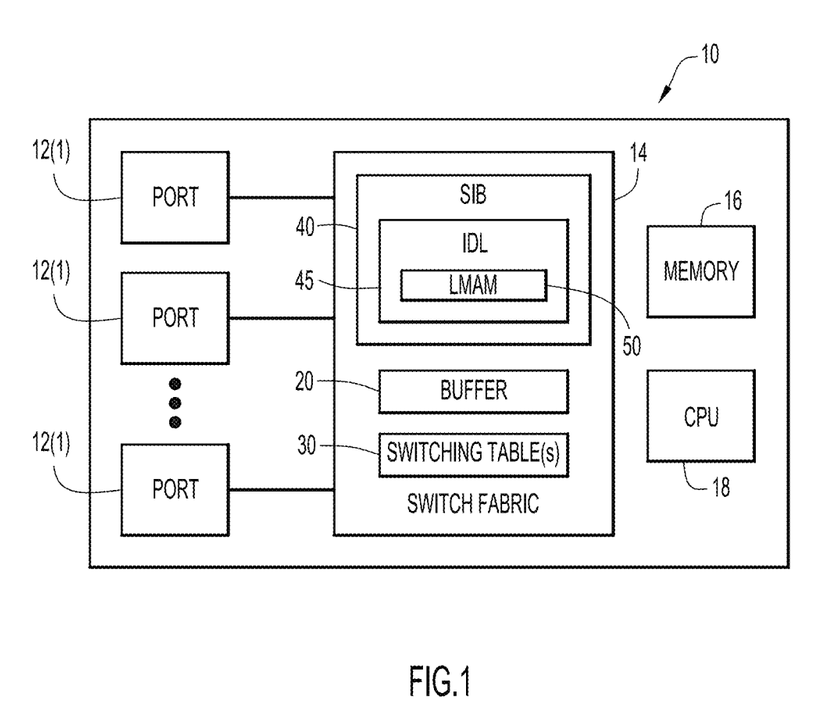
FIG. 1 is a block diagram of an example network device in which the Label Masked Addressable Memory (LMAM) techniques presented herein may be performed.

FIG. 1 is a block diagram of an example network device 10 configured to use the LMAM presented herein. The network device 10 includes a plurality of ports 12(1)-12(N) configured to receive packets from a network and to send packets to the network, a switch fabric 14 for switching packets among ports 12(1)-12(N), a memory 16, and central processing unit (CPU) 18. The switch fabric 14 includes one or more buffer(s) 20, switching table(s) 30 and a packet decision unit 40. The packet decision unit 40 is also known as a switch information base (SIB). The CPU 16 performs higher level control of the operations of the network device 10. The buffer(s) 20 temporarily stores packets within the network device 10, as packets are being processed.

The SIB 40 makes packet decisions including, but not limited to security, quality of service (QoS), statistics, ingress and egress access control policies, classification, marking, adding or deletion of packet fields, load balancing, multi-tenancy handling, Layer 2 bridging (switching) and Layer 3 routing, and dropping of packets. The switch fabric 14 may be implemented in digital logic gates in one or more application specific integrated circuits (ASICs).

SIB 40 includes interface derivation logic (IDL) 45 to derive information, including keys, from packet fields, and to use that information for table look-up operations that support functions in the SIB. IDL 45 includes one or more Label Masked Addressable Memories (LMAMs) 50, each of which serves as an efficient, programmable, hash-based search engine to perform the table look-up operations. LMAMs 50 enable the SIB 40 to perform fast searches for data related to the functions performed in the SIB 40, in a manner described in detail below.

Memory 16 may comprise read only memory (ROM), random access memory (RAM), magnetic disk storage media devices, optical storage media devices, flash memory devices, electrical, optical, or other physical/tangible memory storage devices. The CPU 18 is, for example, a microprocessor or microcontroller. Thus, in general, the memory 16 may comprise one or more tangible (non-transitory) computer readable storage media (e.g., a memory device) encoded with software comprising computer executable instructions and when the software is executed (by the CPU 18) it is operable to perform the techniques described herein. For example, the operations of LMAMs 50 may be partially or completely performed in software stored in memory 18 and executed by the CPU 18.

The network device 10 can be any network device now known or hereinafter developed, including a switch, router, gateway, a software stack on a host device, a virtual network interface card (VNIC), virtual switches, and a physical network interface card (including those that support virtualization). The LMAM techniques are described herein in the context of interface derivation logic in a network device by way of example, only. The LMAM techniques are not limited to interface derivation logic in a network device. It is understood that the LMAM techniques may be employed in any context in which a table look-up/search is used, such as in the network device, or in any other context unrelated to the network device.

Figure 2:
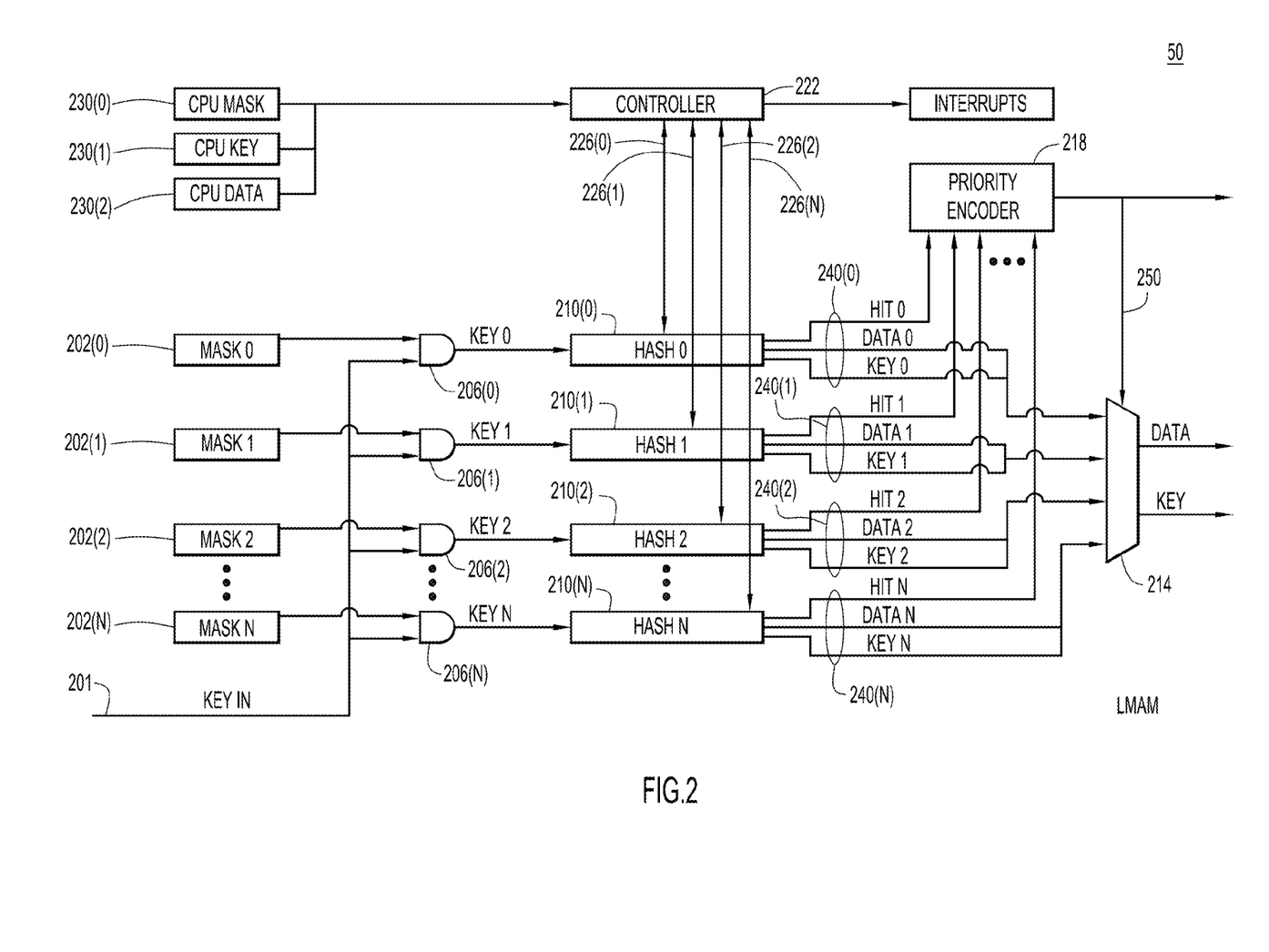
FIG. 2 is a detailed block diagram of the LMAM used to perform table look-up or search operations in the network device of FIG. 1.

Turning now to FIG. 2, a more detailed example diagram is shown for LMAM 50. At a high level, IDL 45 (from FIG. 1) derives information, including an input key (KEY_IN) 201, from packets being processed by the network device 10, and passes the information to LMAM 50. Based on input key 201 and the key masks, LMAM 50 performs a hash based search/table lookup in the LMAM. If the search is successful, LMAM 50 outputs a found data value DATA and an associated masked key KEY (depicted at the far right hand side of FIG. 2) resulting from the search.

LMAM 50 includes the following components that cooperate to perform the above mentioned search: multiple mask registers 202(0)-202(N) to store respective, predetermined key masks MASK_0-MASK_N (also referred to as "masks"); multiple mask modules 206(0)-206(N); multiple hash modules 210(0)-210(N); an output selector 214; and a priority encoder 218. LMAM 50 also includes a controller 222 to communicate with, i.e., read from and write to, hash modules 210(0)-210(N) over respective data buses 226(0)-226(N), based on data stored in a set of registers 230(0)-230(2) coupled to the controller 222. Each of the aforementioned components of LMAM 50 may exchange data with CPU 18 and memory 16 of network device 10 over one of more address and data buses not shown for the sake of simplicity. The ensuing description assumes that hash modules 210(0)-210(N) have been pre-programmed with appropriate data and masked keys, described below. However, hash modules 210(0)-210(N) may be updated with new data as will be described below in connection with FIG. 6.

CPU 18 of device 10 may program mask registers 202(0)-202(N) with respective masks MASK_0-MASK_N, which may be formatted as multi-bit data words. Mask registers 202(0)-202(N) provide their respective masks MASK_0-MASK_N in parallel, i.e., concurrently, to respective ones of the mask modules 206(0)-206(N). Input key 201 is also provided to each of mask modules 206(0)-206(N) in parallel. Input key 201 may be formatted as a multi-bit data word, similar to each mask MASK_i. Mask modules 206(0)-206(N) operate in parallel to mask input key 201 with the respective masks MASK_0-MASK_N, to produce masked keys KEY_0-KEY_N, in parallel. In one embodiment, each of mask modules 206(0)-206(N) logically ANDs each bit in its respective key mask with a correspondingly positioned bit in input key 201. Mask Modules 206(0)-206(N) provide masked keys KEY_0-KEY_N to respective hash modules 210(0)-210(N).

As mentioned above, input key 201 comprises a multi-bit word. In an embodiment, the multi-bit word representing input key 201 includes multiple predetermined fields (also referred to herein as "labels," discussed further below), each of the predetermined fields comprising a group of bits. In such an embodiment, masks MASK_0-MASK_N are each configured to cause mask modules 206(0)-206(N) to mask one or more of the multiple fields of the input key, such that the masked keys KEY_0-KEY_N each represent the input key with the corresponding one or more fields masked therein. In one embodiment, a field of input key 201 may be considered masked when each data bit in the field is set equal to a logic zero. However, other embodiments, other suitable masking techniques may be used to mask a given field.

Each hash module 210(i) (where i=0 . .N) performs an internal data search, i.e., a hash-based search or table look-up, based on the respective masked key KEY_i provided thereto, and produces a set of outputs 240(i) resulting from the search, as is now described. Each hash module 210(i) includes (a) a hash function implemented in digital logic to hash the respective masked key KEY_i to an index, and (b) a hash table comprising as series of entries or buckets (memory locations), each identified by a corresponding index, to store a data value of interest and an associated masked key, i.e., the same masked key that hashes to the index identifying that entry. If masked key KEY_i hashes to an index of a bucket that also contains that same masked key, then it is assumed that the search was successful because matching information was found, and a hit is declared. To declare the hit, hash table 210(i) asserts the corresponding hit flag HIT_i in the set of hash table outputs 240(i), and also outputs both the found data DATA_i and the associated (matching) masked key KEY_i from the found bucket, in the hash table outputs 240(i). Hash modules 210(0)-210(N) and their hash tables may use DLEFT hash-based technology, or any other hash-based technology appropriately sized (now known or hereinafter developed) that is suitable to operate in conjunction with the techniques described herein. The hash tables may comprise static random-access memory (SRAM) or any other suitable memory technology.

Accordingly, hash modules 210(0)-210(N) perform parallel hash-based searches or table look-ups based on masked keys KEY_0-KEY_N (which are each derived from input key 201), and produce parallel outputs 240(0)-240(N) reflective of the search results. Hash modules 210(0)-210(N) provide respective (i) hit flags HIT_0-HIT_N to priority encoder 218, and (ii) found data values DATA_0-DATA_N along with their associated masked keys KEY_0-KEY_N to data selector 214. Priority encoder 218 prioritizes, i.e., assigns distinct priorities to, masks MASK_0-MASK_N, and provides a selector control signal 250 to selector 214. Selector 214 selects from among found data values DATA_0-DATA_N and their associated masked keys KEY_0-KEY_N based on control signal 250, and outputs the selected data value as DATA and its associated masked key as KEY. In the event that two or more of hash modules 210(0)-210(N) have indicated successful searches (hits), then priority encoder 218 causes selector 214 to select the higher priority data and associated masked key based on the assigned priorities.

Several properties of the LMAM lookups or searches described above are now discussed. The lookup/search requirements for a feature (e.g., certain types of information or data) that can benefit from an LMAM are subtly different from other features that typically need a TCAM. Below are three properties that the LMAM exploits to create an inexpensive search engine:

a. Label Masking: The input key used for an LMAM lookup does not require the ability to have every bit therein masked; instead only groups of bits (or labels) are masked together. This means TCAMs are typically wasteful for keys of this type by providing the ability to mask every bit.

b. Few Mask Vectors: The number of simultaneously useful masks in an operating configuration is small. For example consider a key with 5 labels; this yields 32 different ways to mask the labels for a key search. However, for some features, due to a correlation between labels, there are keys that have only a small subset of their masks that are actually useful. As will be discussed below, the LMAM has discrete components based on masks, which translates to a bounded number of masks that a configuration can support.

c. Few One-Off Entries: The number of "one-off" entries in an operating configuration is small. One-off entries need a different mask and a dedicated associated hash module. Just as mentioned in property (b) above, the LMAM includes discrete components, therefore large numbers of one-off entries are wasteful of LMAM capacity.

The above properties combine together to create an opportunity to build a cheaper search engine alternative in the form of an LMAM. The description below indicates how Layer 2 and Layer 3 interface derivation logic possesses these properties.

As mentioned above, LMAM 50 performs searches based on input key 201. An example L2/L3 interface derivation may be generalized as including such an LMAM search based on a key (e.g., key 201) including three sequential fields, where each field includes a contiguous group of data bits. Each of the fields is referred to as a label. Together, the three fields or labels define an ingress port, a source vif (virtual network interface), and a vlan (virtual local area network (LAN)), where vlan may be an outer-vlan or an inner-vlan. Thus, the key descriptor may conform to the following logical format: Key={port, svif, vlan}.

Given that the Key={port, svif, vlan}, appropriate fields in the masks (e.g., in masks MASK(0)-MASK(N)) may be identified based on the fields or labels of the Key, hence the name "label" masked addressable memory (LMAM). In a switch supporting Layer 2, Layer 3, and virtualization, there are three masks of interest, where each mask masks one or more appropriate fields of the Key. In the masks identified below, a masked field is identified (or replaced) with an asterisk (*) in the Key descriptor, where the asterisk represents a field of zero logic bits that are to be logically ANDed with corresponding bits in the Key:
  a. L2 interface (IF)–mask={*, *, vlan}, to mask the port and vif for basic L2 bridge interfaces;
  b. L3 interface or localized L2 interface–mask={port,*, vlan}, to mask the svif for non-virtualized pure L3 interfaces or localized L2 interfaces; and
  c. L3 sub-interface (SubIF)–mask={port, svif, vlan}, no fields are masked for virtualized ports with L3 sub interfaces.

The above example includes a key (and mask) with three fields. However, keys and masks with many more fields are possible, depending on the architecture in which the LMAM is embodied.

Figure 3:
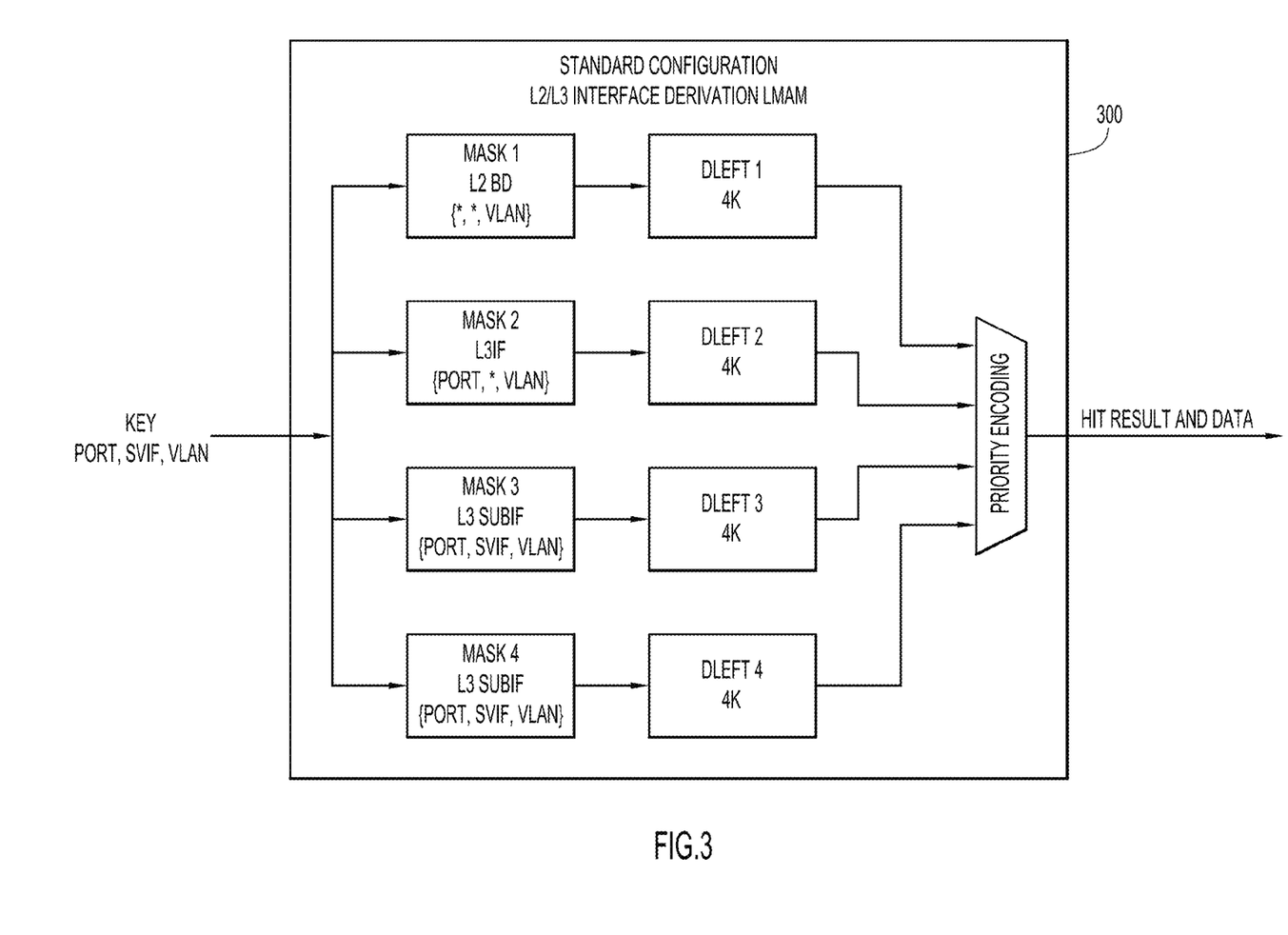
FIG. 3 is a block diagram of an example LMAM employed in L2/L3 interface derivation logic for generalized L2 and L3 processing with support for virtualization.

FIG. 3 is a block diagram of an example LMAM 300 employed in L2/L3 interface derivation logic for generalized L2 and L3 interfaces with support for virtualization. LMAM 300 performs a search based on an input key Key={port, svif, vlan}. Each of the mask blocks Mask1-Mask4 includes a corresponding mask register (e.g., mask register 202(*i*) from FIG. 2) and a corresponding mask module (e.g., mask module 206(*i*) from FIG. 2), which together mask the input Key with the indicated mask, to produce a masked key (e.g., KEY_i, from FIG. 2). For example:
  a. Mask1 masks Key={port, svif, vlan} with the L2 BD mask={*, *, vlan};
  b. Mask2 masks Key={port, svif, vlan} with the L3 IF mask={port, *, vlan};
  c. Mask3 masks Key={port, svif, vlan} with the L3 SubIF mask={port, svif, vlan}; and
  d. Mask4 masks Key={port, svif, vlan} with the L3 SubIF mask={port, svif, vlan}.

In the mask blocks 1-4, the term "BD" refers to "Bridge Domain," an L2 broadcast domain, and the term "IF" refers to "interface."

LMAM 300 includes hash modules DLEFT1-DLEFT4, each implemented with DLEFT hash tables, as is known to one of ordinary skill in the relevant art. Each hash module DLEFTi includes a hash table of 4k entries or buckets, for a total of 16k entries across all four of the hash modules. Each of the entries holds a data value and an associated masked key.

LMAM 300 also includes a "Priority Encoding" block, which represents a priority encoder (e.g., priority encoder 218) combined with a selector (e.g., selector 214).

Figure 4:
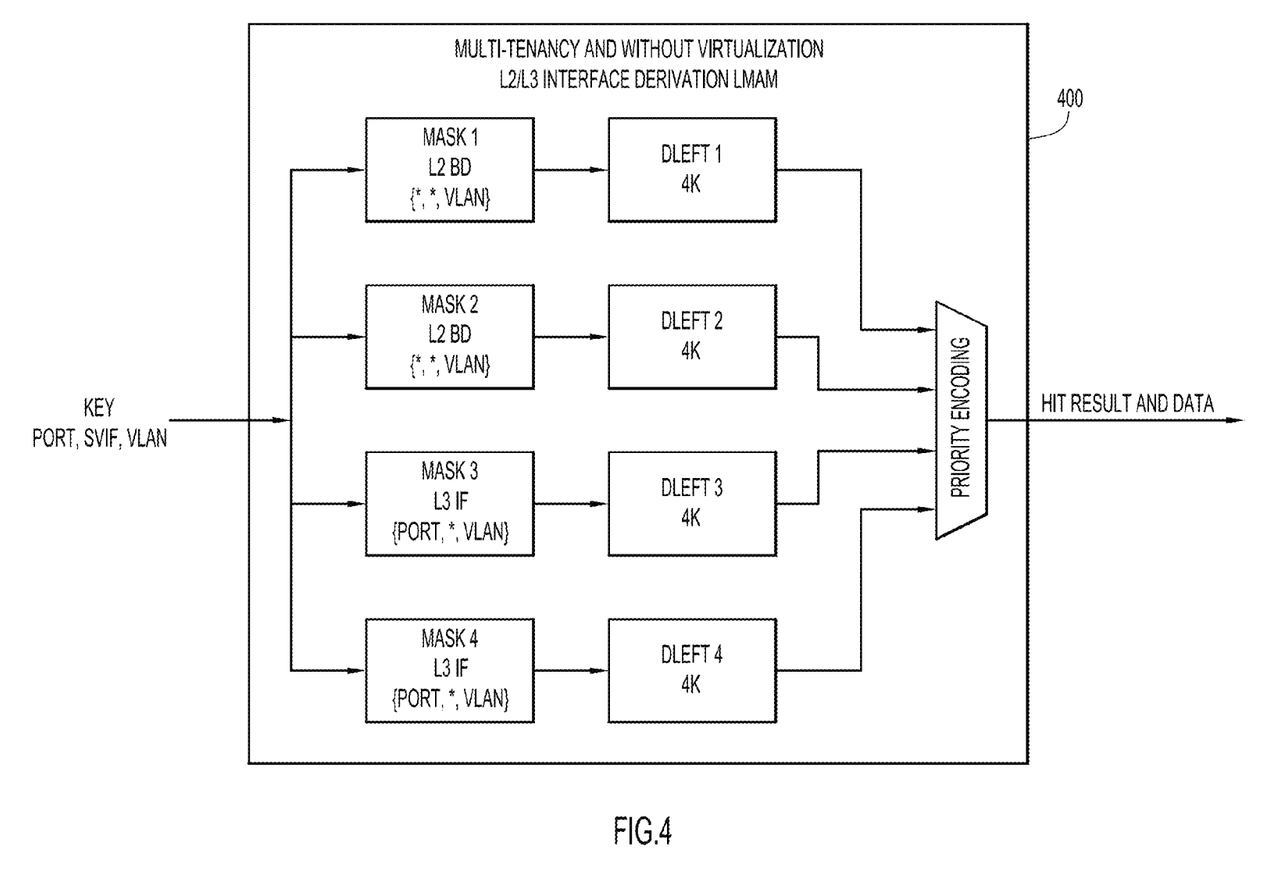
FIG. 4 is a block diagram of an example LMAM employed in L2/L3 interface derivation logic for multi-tenancy without virtualization.

FIG. 4 is a block diagram of an example LMAM 400 employed in L2/L3 interface derivation logic for multi-tenancy without virtualization. As depicted in FIG. 4, a different set of masks are used to mask the input Key relative to the set used in LMAM 300 of FIG. 4. LMAM 400 applies the following masks to the Key:
  a. Mask1 masks Key={port, svif, vlan} with the L2 BD mask={*, *, vlan};
  b. Mask2 masks Key={port, svif, vlan} with the L2 BD mask={*, *, vlan};
  c. Mask3 masks Key={port, svif, vlan} with the L3 IF mask={port, *, vlan}; and
  d. Mask4 masks Key={port, svif, vlan} with the L3 IF mask={port, *, vlan}

An Access Control List (ACL) implementation using an LMAM is now described briefly. A traditional ACL implementation may use a TCAM with a large key to provide support for a wide variety of features. Disadvantageously, such an implementation requires a large amount of hardware resources in terms of area and power, which in turn limits the total ACL capacity that can be allocated for a switch device. An LMAM used in conjunction with a TCAM advantageously provides the same ACL functionality with a higher capacity by reducing the total area cost.

A typical IPv4 ACL key may have over 20 different fields that come from the packet and the switch itself. Some of these fields do not require single-bit level masking, and therefore could be placed into an LMAM. To implement this, one would select the ACL fields that only require label level masking and have a low number of useful mask permutations; this portion of the key would be looked-up in an LMAM.

TCAMs are typically implemented in banks where one ACL feature is isolated to a single bank of TCAM. To simplify the matching logic of this hybrid implementation, the LMAM hash module sizes could be selected to match the TCAM bank size. All ACL keys with the same mask for the LMAM portion of the key would be placed in the corresponding TCAM bank. For an ACL hit, there would need to be a hit in the same bank of LMAM and TCAM.

This solution could reduce the width of the TCAM for an ACL. The savings in TCAM bits allows for an implementation with an increased total ACL capacity.

Figure 5:
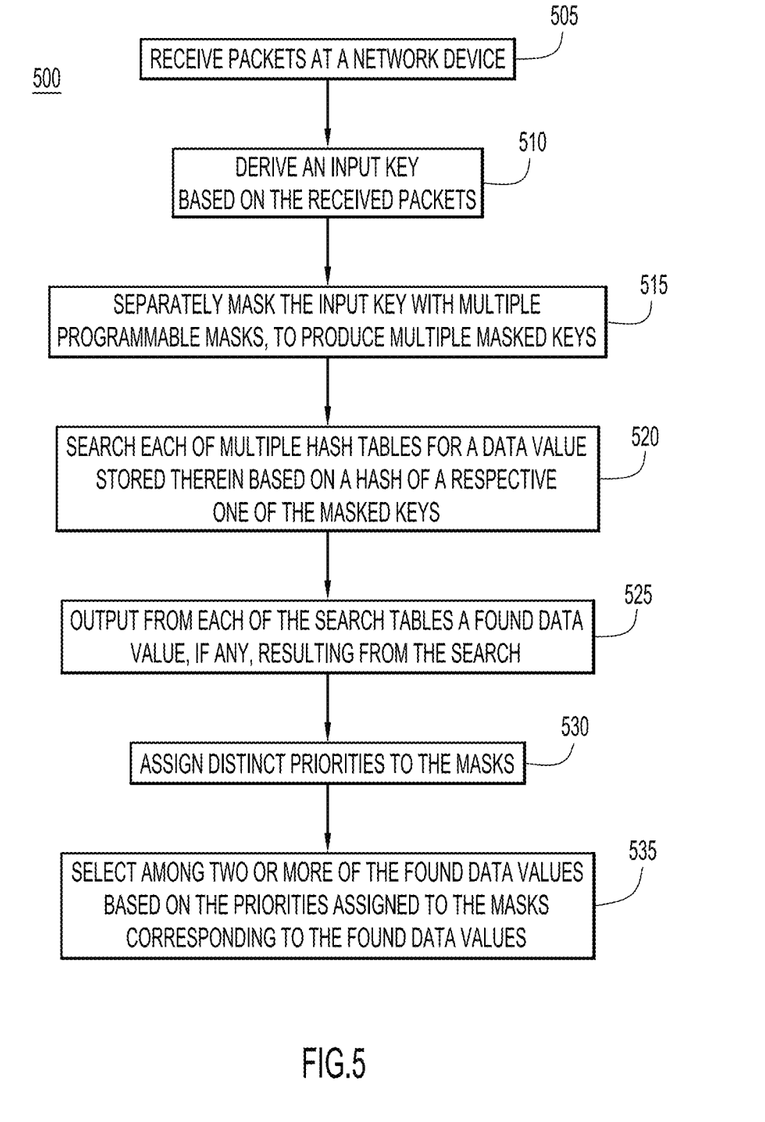
FIG. 5 is a flowchart depicting operations performed by the LMAM in the network device of FIG. 1.

FIG. 5 is a flowchart of an example method 500 that involves the operations of the LMAM 50 in network device 10. Reference is also made to FIG. 2 for purposes of this description. At 505, network device 10 receives data packets. At 510, network device 10 derives an input key 201 based on the received packets. At 515, mask modules 206(0)-206(N) separately mask input key 201 with programmable masks MASK_0-MASK_N, to produce multiple corresponding masked keys KEY_0-KEY_N. In the embodiment where input key 201 comprises a multi-bit word having multiple predetermined fields, masks MASK_0-MASK_N are each configured to cause mask modules 206(0)-206(N) to mask one or more of the multiple fields of the input key based, such that the masked keys KEY_0-

KEY_N each represent the input key with the corresponding one or more multiple fields masked therein.

At 520, each of hash modules 210(0)-210(N) searches its respective hash table for a data value stored therein based on a hash of a respective one of masked keys KEY_0-KEY_N. At 525, each of the hash modules 210(0)-210(N) outputs a found data value (and its associated masked key), if any, resulting from the search. At 530 and 535, selector 214 and priority encoder 218 cooperate to select among the found data values (from 525), and output the selected data value. More specifically, at 530, priority encoder 218 assigns distinct priorities to masks MASK_0-MASK_N. Then, at 535, if two or more data values are found, then selector 214 selects among the two or more found data values based on the priorities assigned to the masks corresponding to the found data values.

LMAM 50 may be updated with new information prior to the time when the LMAM is deployed, or after it has been deployed to support field reconfiguration of network device 10. Updating LMAM 50 may include inserting new information and/or deleting existing information.

Figure 6:
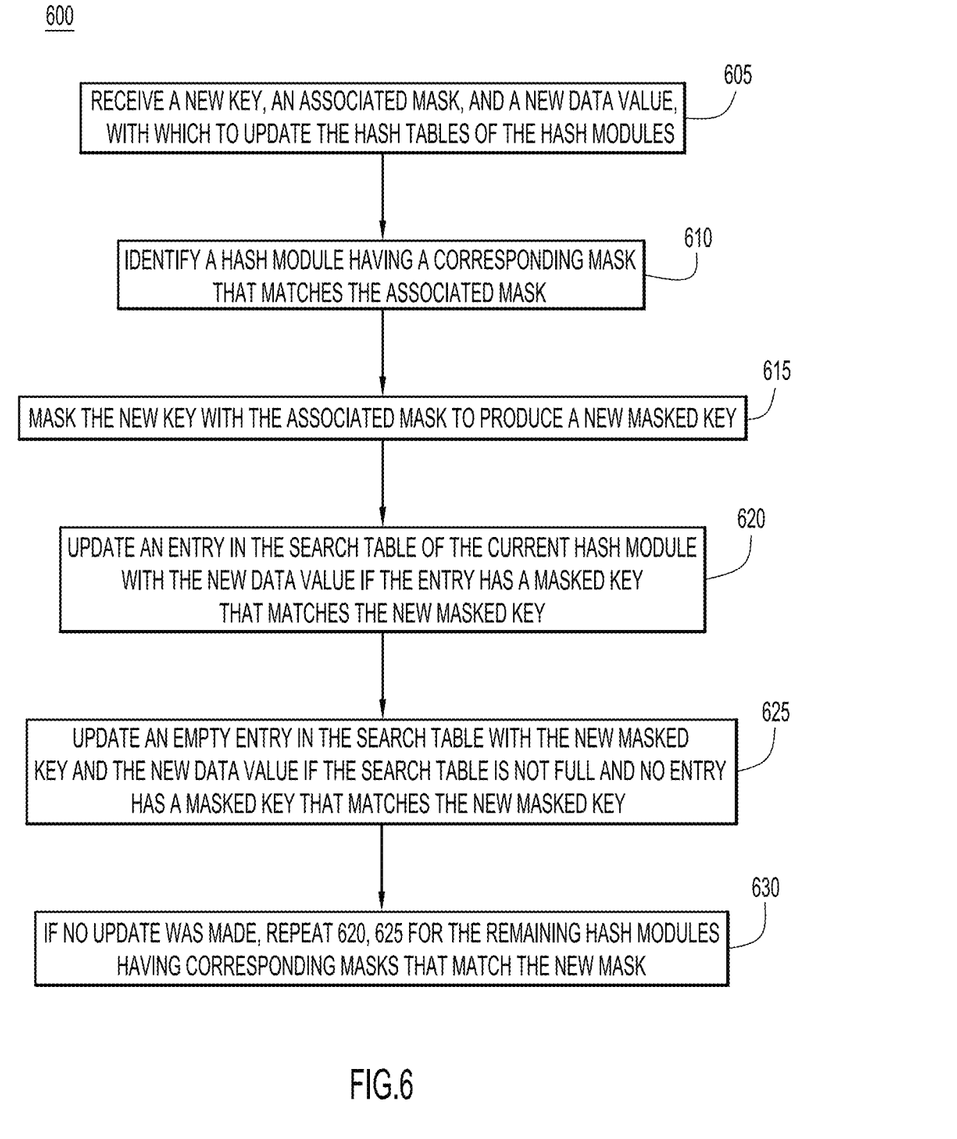
FIG. 6 is a flowchart of an example method of updating an LMAM with new information.

FIG. 6 is a flowchart of example method 600 of updating LMAM 50 with new information, e.g., a new key, with an associated mask and a new data value. Reference is made to FIG. 2 in conjunction with the flowchart of FIG. 6.

At 605, LMAM 50 receives a new key, an associated mask, and a new data value with which to update the hash tables of the hash modules 210(0)-210(N). For example, CPU 18 writes a mask CPU_MASK to register 230(0), a new key CPU_KEY to register 230(1), and a new data value CPU_DATA to register 230(2).

At 610, controller 222 identifies a hash module among hash modules 210(0)-210(N) having a corresponding mask among masks MASK_0-MASK_N that matches the mask CPU_MASK. At 615, controller 222 masks the new key CPU_KEY with the mask CPU_MASK, to produce a new masked key.

At 620, controller 222 updates an entry (or bucket) in the search table of the hash module identified at 610 with the new data CPU_DATA if the entry contains a masked key that matches the new masked key. At 625, controller 222 updates an empty entry in the search table of the identified hash module with the new data CPU_DATA and the new masked key if the update at 620 failed and the searched hash table is not full.

If updates at 620 and 625 fail because the searched hash table is full, then 620-625 are repeated for the remaining hash modules among hash modules 210(0)-210(N) that have corresponding masks among masks MASK_0-MASK_N that match the new mask CPU_MASK.

In summary, the foregoing presents techniques related to the use of an LMAM to perform hash based searching or table lookups to decrease search latency and integrated circuit area requirements, and increase scalability and flexibility, all while supporting virtualization and multi-tenancy in L2/L3 interface derivation logic of a network device.

The above description is intended by way of example only.

What is claimed is:

1. An apparatus, comprising:
a Label Masked Addressable Memory (LMAM) to receive an input key related to Layer 2 and Layer 3 packet switching protocols, the input key including fields that define a port of a network device, a network interface, and a virtual local area network (VLAN), the LMAM comprising:
multiple mask modules each configured to mask one or more of the port, the network interface, and the VLAN fields of the input key with a respective programmable mask, to produce multiple masked keys;
multiple hash modules, each corresponding to a respective one of the masked keys and including a hash table having entries each to store both a data value and an associated masked key related to the Layer 2 and Layer 3 switching protocols, each of the hash modules configured to:
search the hash table for an entry based on a hash of the corresponding masked key; and
output both a data value and associated masked key of a found entry, if any, resulting from the search;
a selector to select among the found data values and the associated masked keys and output both the selected data value and the associated masked key; and
a priority encoder configured to assign distinct priorities to the masks and, correspondingly, the found data values, and to cause the selector to select among two or more of the found data values and the associated masked keys based on the assigned priorities.

2. The apparatus of claim 1, wherein the multiple mask modules are configured to produce the multiple masked keys concurrently, and the multiple hash modules are configured to perform their respective hash table searches and output their found data values, if any, concurrently.

3. The apparatus of claim 1, wherein:
the input key comprises a multi-bit word having the fields, each of the fields comprising a group of bits; and
each of the mask modules is configured to mask one or more of the fields of the input key, such that the masked keys each represent the input key with the corresponding one or more fields masked therein.

4. The apparatus of claim 3, wherein each mask module is configured to perform a bit-wise logical AND of the input key with the corresponding mask.

5. The apparatus of claim 1, further comprising a controller configured to update the hash tables of the hash modules using a new key, an associated mask, and a new data value, wherein the controller is configured to, for each hash module having a corresponding mask that matches the associated mask:
mask the new key with the associated mask to produce a new masked key;
update an entry in the hash table with the new data value if the entry has a masked key that matches the new masked key; and
update an empty entry in the hash table with the new masked key and the new data value if the hash table is not full and no entry has a masked key that matches the new masked key.

6. The apparatus of claim 1, wherein the mask modules, the hash modules, and the selector of the LMAM collectively comprise a data search engine to perform hash-based searches to thereby derive look-up table information related to the Layer 2 and Layer 3 switching protocols, wherein the input key is derived from packets received at ports of a network switch and related to the switching protocols.

7. The apparatus of claim 1, wherein each of the hash tables is a d-left hashing table configured to perform d-left hashing.

8. A method, comprising:
at a Label Masked Addressable Memory (LMAM) to receive an input key related to Layer 2and Layer 3 packet switching protocols, the input key including fields that define a port of a network device, a network interface, and a virtual local area network (VLAN):
separately masking the input key with multiple programmable masks each to mask one or more of the port, the network interface, and the VLAN fields of the input key, to produce multiple masked keys;
searching respective entries in each of multiple hash tables based on a hash of a respective one of the masked keys, wherein the respective entries of each hash table store both a data value and an associated masked key related to the Layer 2 and Layer 3 switching protocols;
outputting from each of the hash tables both a found data value and an associated masked key from a found entry, if any, resulting from the searching; and
selecting among the found data values and the associated masked keys and outputting both the selected data value and the associated masked key, wherein the selecting includes assigning distinct priorities to the masks, and selecting among two or more of the found data values and the associated masked keys based on the priorities assigned to the masks corresponding to the found data values.

9. The method of claim 8, wherein:
the separately masking includes separately masking with the multiple programmable masks concurrently, thereby producing the multiple masked keys concurrently;
the searching includes searching each of the hash tables concurrently; and
the outputting includes outputting the found data values concurrently.

10. The method of claim 8, wherein:
the input key comprises a multi-bit word having the fields, each of the fields comprising a group of bits; and
the separately masking includes masking one or more of the fields of the input key, such that the masked keys each represent the input key with the corresponding one or more fields masked therein.

11. The method of claim 8, further comprising updating the hash tables of the hash modules using a new key, an associated mask, and a new data value, wherein the updating includes, for each hash module having a corresponding mask that matches the associated mask:
masking the new key with the associated mask to produce a new masked key;
updating an entry in the search table with the new data value if the entry has a masked key that matches the new masked key; and
updating an empty entry in the search table with the new masked key and the new data value if the search table is not full and no entry has a masked key that matches the new masked key.

12. The method of claim 8, further comprising:
receiving packets at a network device; and
deriving the input key from packets received at the network device to perform Layer 2 and Layer 3 switching of the packets at the network device.

13. A non-transitory computer readable tangible storage media encoded with instructions that, when executed by a processor that implements a Label Masked Addressable Memory (LMAM), cause the processor to:
receive an input key related to Layer 2 and Layer 3 packet switching protocols, the input key including fields that define a port of a network device, a network interface, and a virtual local area network (VLAN);
separately mask the input key with multiple programmable masks each to mask one or more of the port, the network interface, and the VLAN fields of the input key, to produce multiple masked keys;
search respective entries in each of multiple hash tables based on a hash of a respective one of the masked keys, wherein the respective entries of each hash table stores both a data value and an associated masked key related to the Layer 2 and Layer 3 switching protocols;
output from each of the hash tables both a found data value and an associated masked key from a found entry, if any, that result from the search; and
select among the found data values and the associated masked keys and outputting both the selected data value and the associated masked key, wherein the instructions that cause the processor to select comprise instructions that cause the processor to assign distinct priorities to the masks, and select among two or more of the found data values and the associated masked keys based on the priorities assigned to the masks corresponding to the found data values.

14. The non-transitory computer readable tangible storage media of claim 13, wherein:
the instructions that cause the processor to separately mask comprise instructions that cause the processor to separately mask with the multiple programmable masks concurrently, to produce the multiple masked keys concurrently;
the instructions that cause the processor to search comprise instructions that cause the processor to search each of the hash tables concurrently; and
the instructions that cause the processor to output comprise instructions that cause the processor to output the found data values concurrently.

15. The non-transitory computer readable tangible storage media of claim 13, wherein:
the input key comprises a multi-bit word having the fields, each of the fields comprising a group of bits; and
the instructions that cause the processor to mask include instructions that cause the processor to mask one or more of the fields of the input key, such that the masked keys each represent the input key with the corresponding one or more fields masked therein.

16. The non-transitory computer readable tangible storage media of claim 13 further comprising instructions that, when executed, cause the processor to update the hash tables of the hash modules using a new key, an associated mask, and a new data value, wherein the instructions to cause the processor to update include instructions to cause the processor to:
mask the new key with the associated mask to produce a new masked key;
update an entry in the search table with the new data value if the entry has a masked key that matches the new masked key; and
update an empty entry in the search table with the new masked key and the new data value if the search table is not full and no entry has a masked key that matches the new masked key.

17. The non-transitory computer readable tangible storage media of claim 13, further comprising instructions that, when executed by the processor, cause the processor to:
receive packets at a network device; and
derive the input key from packets received at the network device to perform Layer 2 and Layer 3 switching of the packets at the network device.

* * * * *